United States Patent [19]
Klees

[11] Patent Number: 5,508,774
[45] Date of Patent: Apr. 16, 1996

[54] AUTOMATIC IMAGE CAPTURE STATION

[75] Inventor: Kevin J. Klees, Rochester, N.Y.

[73] Assignee: Eastman Kodak Company, Rochester, N.Y.

[21] Appl. No.: 275,173

[22] Filed: Jul. 14, 1994

[51] Int. Cl.⁶ .......................... G03B 17/40; G03B 15/06
[52] U.S. Cl. ............................................ 354/266; 354/290
[58] Field of Search ............................ 354/75, 76, 80, 354/266, 290, 292, 412; 273/454, 455, 456

[56] References Cited

U.S. PATENT DOCUMENTS

| | | | |
|---|---|---|---|
| 1,105,484 | 7/1914 | Cannon | 354/266 |
| 2,515,350 | 7/1950 | Lissiansky | 88/74 |
| 2,796,812 | 6/1957 | Koci | 95/1.1 |
| 3,024,020 | 3/1962 | Alton | 273/454 |
| 3,631,781 | 1/1972 | Kennington et al. | 95/14 |
| 3,820,133 | 6/1974 | Adorney et al. | 354/60 |
| 3,821,760 | 6/1974 | Kennedy et al. | 95/14 |
| 3,858,223 | 12/1974 | Holzapfel | 354/266 |
| 4,072,973 | 2/1978 | Mayo | 354/295 |
| 4,738,526 | 4/1988 | Larish | 354/412 |
| 4,891,660 | 1/1990 | Biondo, Jr. | 354/412 |
| 4,930,236 | 1/1990 | Hart | 40/414 |
| 4,965,627 | 10/1990 | Robison | 354/75 |
| 5,262,815 | 11/1993 | Aumiller | 354/290 |

FOREIGN PATENT DOCUMENTS 58-137828  8/1983  Japan ..................... 354/266

Primary Examiner—Michael L. Gellner
Assistant Examiner—Michael Dalakis
Attorney, Agent, or Firm—Francis H. Boos, Jr.

[57] ABSTRACT

An automatic image capture station employing a pressure sensing pad to provide position signals to a controller for use directing the subject to appropriate position in the field of view of the camera or, alternatively, to control the camera operation to improve composition of the image to be captured.

5 Claims, 2 Drawing Sheets

AUTOMATIC IMAGE CAPTURE STATION

FIELD OF THE INVENTION

The invention relates generally to the field of image capture, and in particular to an automatic station employing a mounted image capture device for capturing an image on a user supplied recording medium.

BACKGROUND OF THE INVENTION

Automatic image capture stations are known, particularly in amusement theme parks, for automatically capturing a subject image that records a magic moment for playback or viewing at a future time. These stations have the advantage that a subject can obtain a recorded image without the need to carry a camera. They are also useful in instances in which it is not possible for the subject to have the image captured on the subject's camera. One example of an automatic image capture station is shown in U.S. Pat. No. 4,891,660—Biondo. One type of automatic capture station comprises a booth in which proper positioning of the subject within the field of view of the camera is assured by the restricted bench space provided. An arrangement of this type is suitable for close-up portraits but do not allow for a broader range of image capture, particularly stand-up, natural poses. Other stations employ mirrors to aid the subject in positioning within the field of view of the camera. However, these arrangements are unsatisfactory in that the mirrors are sometimes hard to see and can result in unnatural poses. There is a need for automatic means for positioning of a subject within a camera field of view at an automatic capture station that allows for natural, stand-up posing. The present invention satisfies this need.

SUMMARY OF THE INVENTION

In accordance with the invention, there is provided an automatic image capture station that includes a camera mounted on a support and aimed at a predetermined field of view. The capture station further comprises a subject sensing means, including a sensor pad, for determining the presence and location within the field of view of the subject of the image capture, the pad being located under the field of view and on which the subject is positioned during image capture. The capture station also includes means included in the camera for removable insertion by the subject of an image recording medium and means for activating camera operation to capture an image of the subject on the recording medium after the subject is appropriately positioned within the field of view as indicated by the sensor pad.

DETAILED DESCRIPTION OF THE INVENTION

Figure 1:
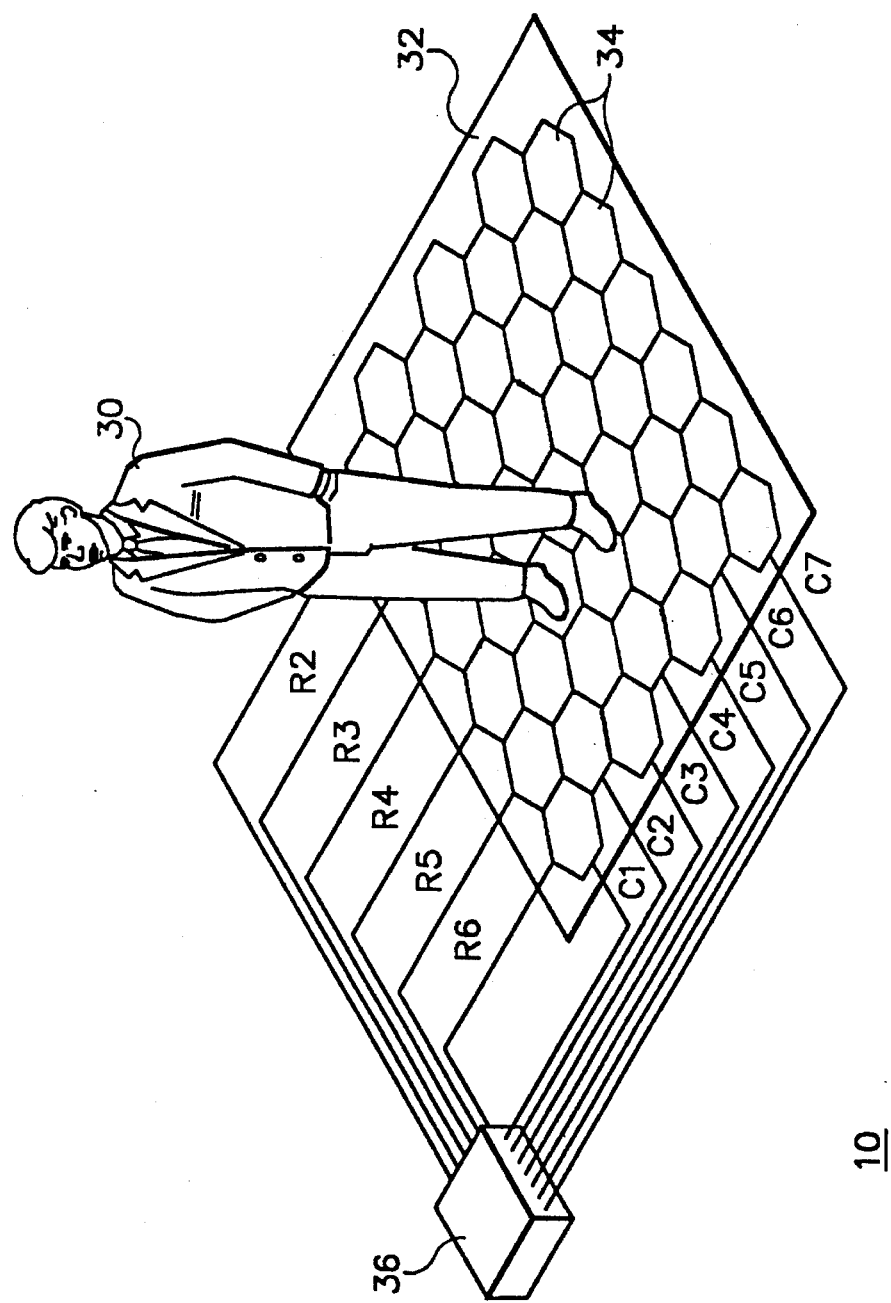
FIG. 1 is a perspective view of an automatic image capture station in accordance with the invention.

FIG. 1 illustrates an image capture station 10 of the invention. The capture station 10 includes a camera 12 that is mounted on a tilt/rotate/translation mechanism 14 positioned on top of a platform 16. The camera includes a motorized zoom lens 18, a flash unit 20 and a speaker 22. The camera 10 is also provided with means including an access door 24 to allow removable insertion of an image recording medium (not shown), e.g. a roll of film, by the subject 30 whose image is to be captured. In the illustrated embodiment, the camera 12 is assumed to be a photographic camera although it could alternatively comprise an electronic camera, in which case the recording medium might then be a video tape. In either case, the camera includes known apparatus for advancing the recording medium to the next available recording space and, optionally, for rewinding the medium after the picture is taken.

In accordance with a particular feature of the invention, the capture station 12 further includes subject sensing means including a sensor pad 32 for determining the presence and location of the subject 30 within the field of view. Pad 32 may be imbedded in the pavement in front of camera 12 below the field of view of the camera lens positioned so that the subject would stand on the pad during the image capture operation. Sensor pad 32 in the illustrated embodiment is comprised of an array of pressure sensors 34, arranged as an array of seven columns of six sensors each. A controller 36, which preferably includes a microcomputer therein, receives input from the sensors 34 via row and column lines R1–R6 and C1–C7 respectively. A visual display 38, viewable by the subject, is mounted near the camera 12. Controller 36 is coupled via connections (not shown) to the camera and to the display device 38 to control the operation thereof.

Figure 2:
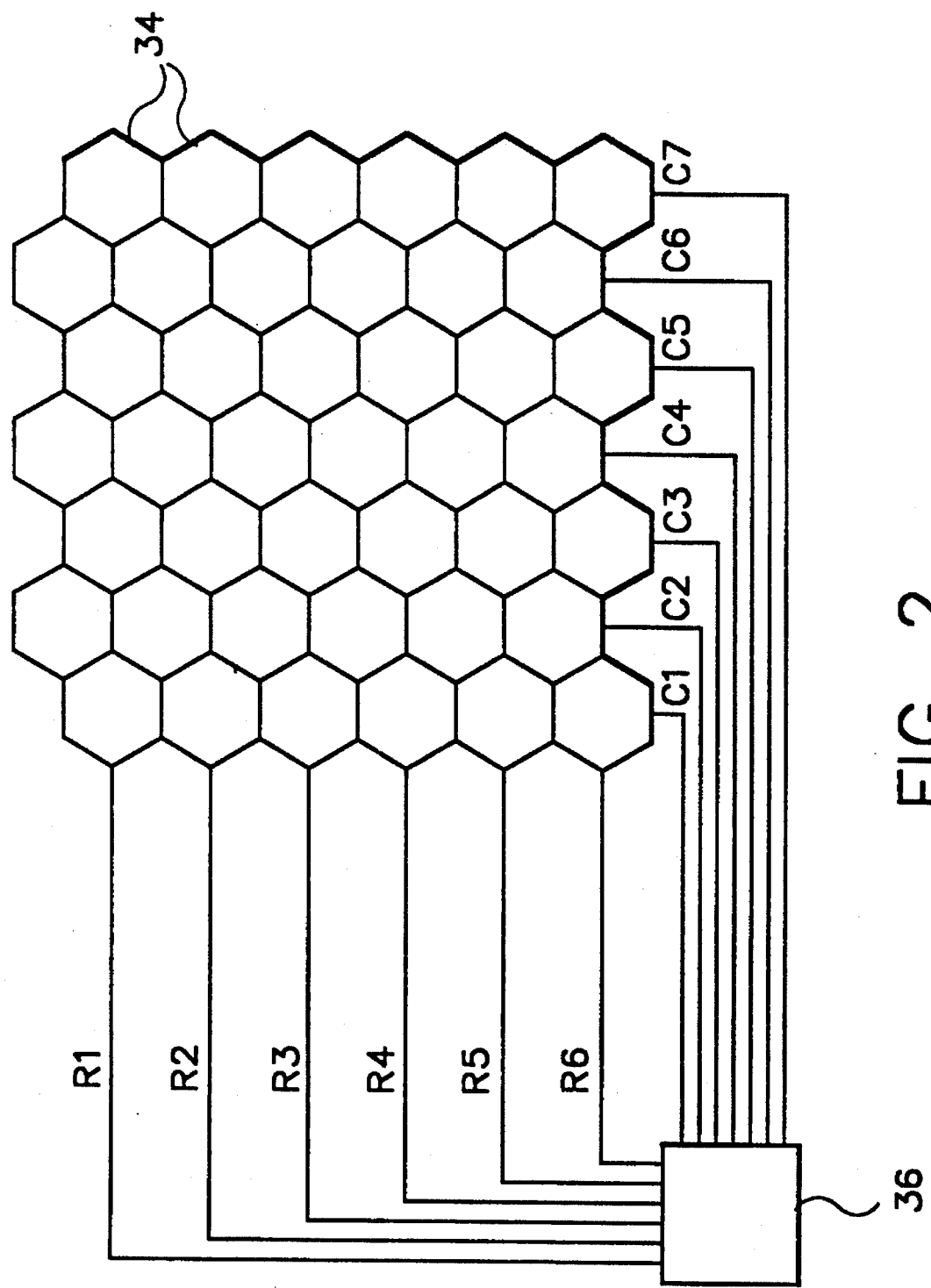
FIG. 2 is a plan view of a sensor pad useful in the image capture station of the invention.

Each of the pressure sensors 34 operates as a normally open single pole single throw switch (SPST). This type of switch has two contacts. One contact of each switch is connected to an electrical "row" connector. The other contact is connected to a "column" connector. As shown in FIG. 2, these signals are labeled R1–R6 for the rows and C1–C7 for the columns. Controller 36 is operative to determine which of the 42 sensors are activated by pressure from the subject 30 standing on the pad 32. The technique for this is similar to keyboard sensing techniques such as described in National Semiconductor CMOS logic Databook Rev. 1, 1988 edition, datasheet for part number 74C923, a 20-key encoder.

Controller 36 reads the data from the sensor array and stores it into memory contained in the controller. Attached to the controller is general purpose read-write memory and read-only (EPROM) memory. The read-only memory stores the program that operates this system, as well as digitized voice recordings. Also contained in the controller are suitable circuits to drive the speaker, the motorized zoom lens, the tilt/rotate/translation mechanism and the camera. Circuitry to drive the subject viewable display and to control the fill flash is also in the controller.

One typical operation begins with the subject on the sensor array. A user of the camera inserts their film into the camera through access door 24. Controller 36 reads a message from memory and displays it on the screen while also playing the audio portion of the message via the speaker 22. The messages could, for example, welcome the subject to the location and direct the subject to the proper location on the sensor pad to place the subject within the field of view of the camera. For this purpose, the controller scans the sensor array to determine where the subject is located. When the data from the array has been stable for some period of time, for example, three seconds, the controller would analyze it. Many techniques exist to reduce an array of image pixels into information about the size and location of commonly valued pixels. These techniques can be applied here to determine the location and size of the subject. After determining that the subject is standing to the left or right of the center of the field of view, the system would direct the subject to move in the appropriate direction for proper positioning in front of the camera. Visual messages for this purpose could also be displayed on the subject viewable display 38.

Once properly situated in front of the camera, the image capture operation would be activated by any suitable means, such as a remote shutter cable (not shown) held by the subject. An alternative approach would utilize the sensor pad 32 for this purpose. In this approach, after the pattern of subject locations has been stable for several seconds, the controller 36 would issue an audible or visual message such as: "Please stomp your foot to take a picture." The controller would sense this action using the sensor pad 32 and could then activate the camera shutter or provide for an intermediate delay period before activating the shutter with a suitable message such as: "Say cheese; three-two-one-click."

Another typical operation would determine from the pattern of pressure sensors that are activated that several subjects are present on the pad. In response, the controller 36 would then cause the camera lens 18 to zoom out using a wider focal length lens setting thus yielding a better composed picture.

Yet another appropriate operation would be to determine how close to the camera a subject is using data from the sensor pad 32. When subjects are close, a smaller amount of fill flash energy is needed. Fill flash is used to overcome strong back or side lighting. When subjects are further away from the camera, a larger amount of fill flash energy would be used. Flash units with controllable amounts of output energy, e.g. quench flash, are well known. A further control would be to respond to the pressure pad information to pan the camera slowly to one side if needed to produce a better composed picture.

The camera employed may be a still photographic film camera with provision for accepting a film cartridge inserted by the user. The camera would have known control provision for advancing the film out of the camera to the first available unexposed film frame. Also possible is the recording of subject location information onto magnetic tracks on the still photographic film in camera 12. The technology for recording magnetic data on photographic film is described more fully in commonly assigned U.S. Pat. No. 4,965,627, the disclosure of which is incorporated herein by reference. Recording of this subject position information would allow the photofinisher to know if the subject is the center, left, or right of the image frame. Suitable print algorithms would then be employed to make detection of flesh tones more accurate thereby allowing for improved quality prints.

After conclusion of the picture taking session, the camera control would operate to rewind the film into the users cartridge and the user would then remove the cartridge from the camera for subsequent use in another camera or for processing. Alternatively, as previously mentioned, the camera might be an electronic still camera with provision for accepting video recording tape and with similar provision for advancing to appropriate location on the tape for recording of the video image information.

The invention has been described with reference to a preferred embodiment. However, it will be appreciated that variations and modifications can be effected by a person of ordinary skill in the art without departing from the scope of the invention.

PARTS LIST

10 image capture station
12 camera
14 tilt/rotate/translate mechanism
16 camera platform
18 zoom lens
20 flash unit
22 speaker
24 film access door
30 subject
32 sensor pad
34 pressure sensors
36 controller
38 visual display

What is claimed is:

1. An automatic image capture station comprising:

a camera mounted on a support and aimed at a predetermined field of view;

subject sensing means including a sensor pad having a two dimensional array of pressure sensors for determining the presence and the distance and lateral position within the field of view of the subject of the image capture, said pad being located under the field of view and on which the subject is positioned during image capture;

means included in the camera for removable insertion by the subject of an image recording medium; and controller means for activating camera operation to capture an image of the subject on the recording medium after the subject is appropriately positioned within the field of view as indicated by said sensor pad.

2. The station of claim 1 wherein said sensor means is responsive to positioning of the subject on the pad includes a two dimensional array of pressure sensors for producing output signals representative of the distance and lateral position of the subject relative to the camera; and said controller means is responsive to said output signals for controlling at least one operating characteristic of the camera.

3. The station of claim 1 further comprising communication means responsive to said sensing means and said controller means for advising a subject improperly positioned in the field of view to reposition to an appropriate position before activation of the camera.

4. The station of claim 1 said camera further includes data recording means responsive to said subject sensing means and said controller means for recording subject position data on said image recording medium.

5. The station of claim 4 wherein said data recording means comprises magnetic recording means for recording data on a magnetic layer formed on said image recording medium.

* * * * *